United States Patent [19]
Wright et al.

[11] Patent Number: 5,474,101
[45] Date of Patent: Dec. 12, 1995

[54] RAPID CLEAN-OUT VALVE ASSEMBLY

[75] Inventors: William R. Wright, Overland Park, Kans.; Lewis F. Alley, Kansas City, Mo.

[73] Assignee: Marlen Research Corporation, Overland Park, Kans.

[21] Appl. No.: 236,174

[22] Filed: May 2, 1994

[51] Int. Cl.$^6$ .................. F16K 43/00; F16K 11/085; F16K 51/00

[52] U.S. Cl. .............. 137/238; 137/315; 137/625.41; 137/625.47; 137/565; 222/148; 222/368; 417/900

[58] Field of Search ............... 137/237, 238, 137/240, 315, 625.4, 625.41, 625.46, 625.47, 625.48, 874, 876; 222/148, 368; 417/900; 406/62, 65; 414/219

[56] References Cited

U.S. PATENT DOCUMENTS

| | | | |
|---|---|---|---|
| 850,762 | 4/1907 | Kolla | 137/876 |
| 1,767,658 | 6/1930 | Fantz | 137/876 |
| 3,132,669 | 5/1964 | Feldsted | 137/874 |
| 3,834,418 | 9/1974 | Clancy | 137/874 |
| 4,059,205 | 11/1977 | Heyl | 222/368 |
| 4,076,150 | 2/1978 | Didrickson | 222/368 |
| 4,600,032 | 7/1986 | Heyl | 137/315 |
| 4,602,727 | 7/1986 | Jackson | 222/368 |
| 4,830,043 | 5/1989 | Heyl | 137/315 |
| 4,869,653 | 9/1989 | Powers et al. | 251/175 |
| 4,884,594 | 12/1989 | Powers et al. | 251/175 |
| 4,948,017 | 8/1990 | Heep et al. | 222/368 |
| 4,979,884 | 12/1990 | Letarte et al. | 251/175 |
| 5,002,084 | 3/1991 | Wilson | 137/315 |
| 5,061,158 | 10/1991 | Egli | 417/900 |
| 5,076,317 | 12/1991 | DeWire et al. | 137/315 |
| 5,353,830 | 10/1994 | Mochizuki et al. | 137/240 |
| 5,368,311 | 11/1994 | Heyl | 222/368 |

*Primary Examiner*—George L. Walton
*Attorney, Agent, or Firm*—Hovey, Williams, Timmons & Collins

[57] ABSTRACT

An improved, rapid clean-out valve assembly (36) is provided which is especially adapted for use on a food pump (10) or similar device. The assembly (36) includes a stationary valve body (38) presenting a pair of inlets (44, 46) as well as an outlet (50) and adapted to receive a pivotal valve rotor (52) therein; the rotor (52) is selectively pivotal via an actuator (60) between alternate flow-directing positions respectively communicating each inlet (44 or 46) with outlet (50). Rapid clean-up of the assembly (36) is afforded by means of structure (42) permitting manual translational movement of the internal valve rotor (52) from its operational position within housing (48) to a lowered, clean-out position outside of the confines of the housing (48). The structure (42) includes apertured slider blocks (76, 78) secured to an actuator housing (68), with the blocks (76, 78) receiving corresponding stationary guides (80, 82). A pair of pivotally interconnected links (88, 90) are used to selectively raise and lower the housing (68) and thereby rotor (52), through the medium of manually operable handle (92).

11 Claims, 3 Drawing Sheets

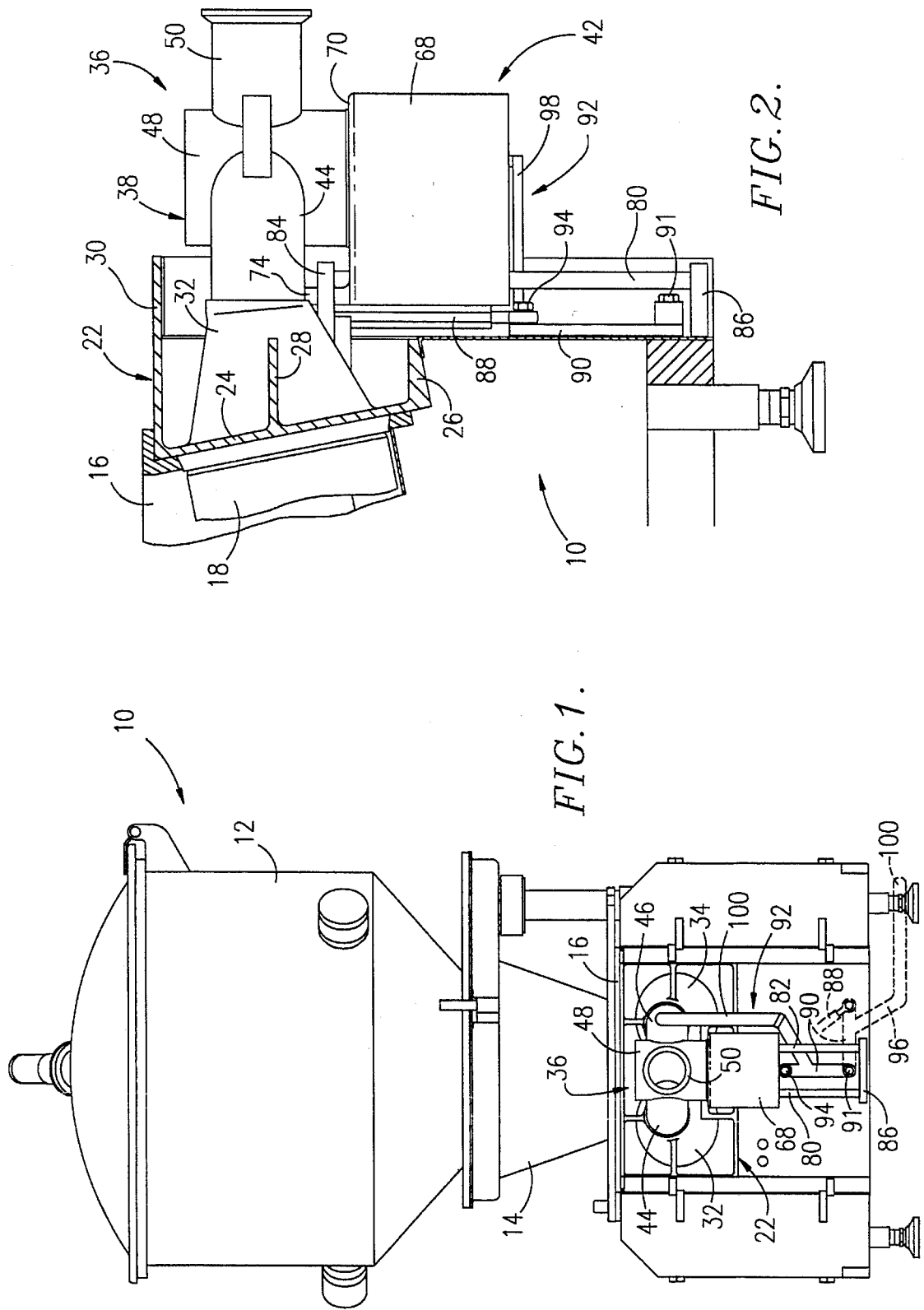

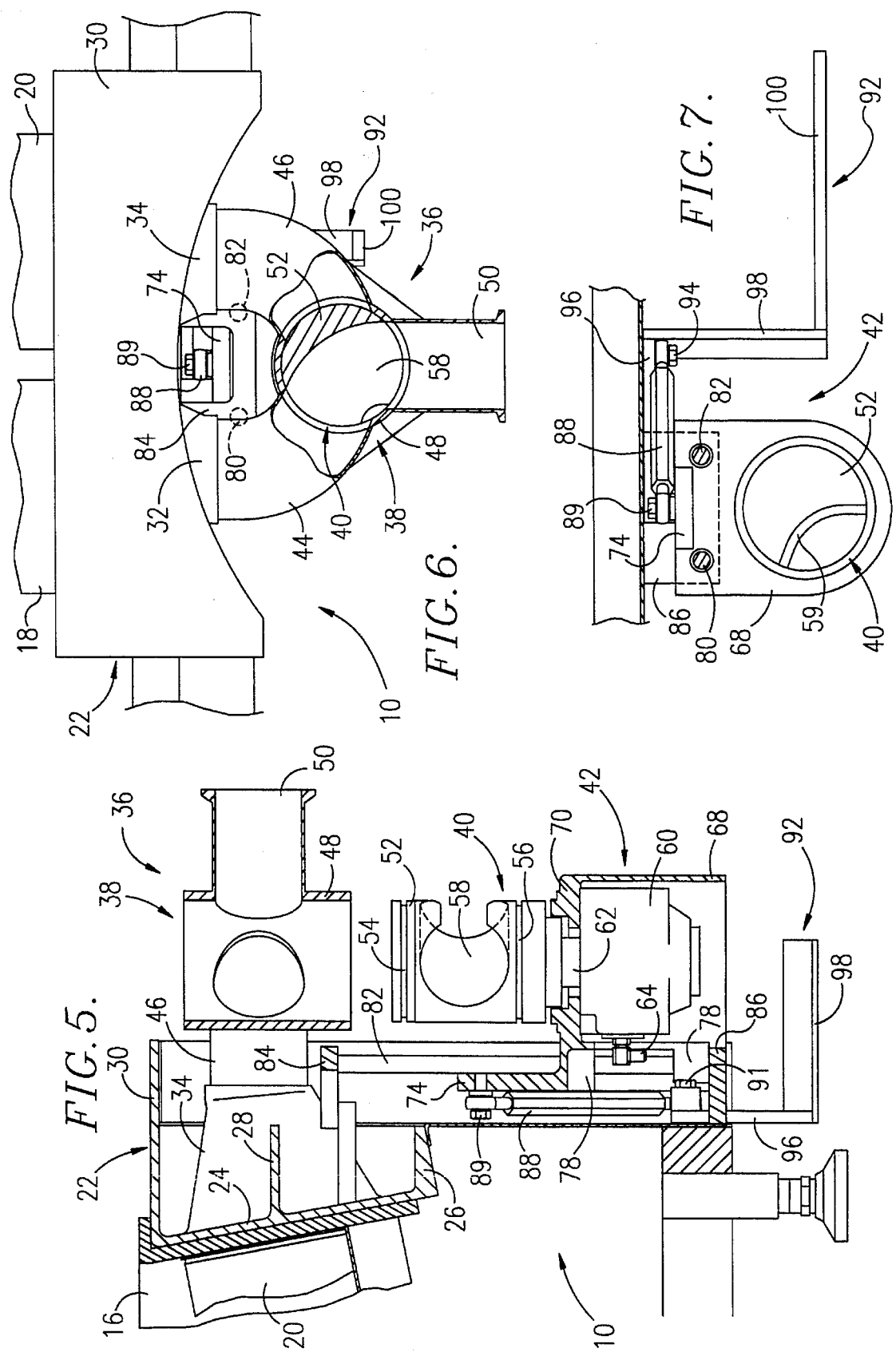

RAPID CLEAN-OUT VALVE ASSEMBLY

BACKGROUND OF THE INVENTION

1. Field of the Invention

The present invention is broadly concerned with an improved valve assembly specifically designed for rapid clean-out operations. More particularly, the valve assembly of the invention is particularly adapted for use in food machinery (although it is not so limited) and includes a stationary valve body with a shiftable valve member therein movable via positional means for selective translational movement of the valve member between a first position within the valve body and a second, clean-out position wherein the valve member is at least partially moved out of the valve body to facilitate clean-up and inspection of the valve assembly.

2. Description of the Prior Art

Food processors often make use of large pumps for pumping and/or portioning of comestible products such as meat or vegetables. One class of food pump of this character which has achieved substantial commercial success is the twin piston food pumps commercialized by Marlen Research Corporation of Overland Park, Kans. Exemplary pumps of this type are illustrated in U.S. Pat. No. 4,869,653 which is incorporated by reference herein.

Piston-type pumps normally include a diverter valve adjacent the forward, outlet end of the pump which is shiftable between two operative positions for alternate delivery of respective charges of material being pumped from each corresponding piston assembly of the pump. Generally speaking, these prior diverter valve assemblies include an outermost, generally Y-shaped valve body with an internal rotor shiftable between positions communicating the respective inlets of the valve assembly with the outlet thereof. While these valve assemblies provide excellent operational characteristics, they can be difficult and time-consuming to clean or repair. As can be appreciated, food processors must periodically clean all food-contacting portions of their pumping units, which necessitates that the diverter valve assemblies thereof be disassembled.

Prior art diverter valves are made up of a considerable number of parts and the disassembly and clean-up operation for the diverter valve assembly alone can consume as much as 15–20 minutes or more. This time factor becomes significant for the food processor, particularly where a given pump must be cleaned several times during the course of a single shift or working day.

There is accordingly a real and unsatisfied need in the art for an improved diverter valve assembly especially adapted for use with food pumps and which is characterized by rapid, simple disassembly, clean-up and/or repair operations.

SUMMARY OF THE INVENTION

The present invention overcomes the problems outlined above and provides a rapid clean-out valve assembly broadly including a valve body having a material inlet and a material outlet, with a valve member located within the valve body and selectively shiftable therein for communicating the inlet and outlet. The overall valve assembly further includes positional means operatively coupled with the valve member for selective translational movement of the valve member between a first position within the valve body in order to permit said selective shifting of the valve body therein, and a second position wherein the valve member is at least partially moved out of the valve body in order to permit rapid cleaning or other servicing of the valve body and valve member.

In preferred forms, the valve body is stationary and generally Y-shaped in configuration and presents a pair of spaced inlets with a single outlet. In such a case, the shiftable valve member is normally a rotor which is selectively pivotal within the valve body. In addition, motive means such as a hydraulic actuator is operatively coupled with the valve member for effecting the selective shifting thereof in timed relationship with pump operations. The positional means is preferably coupled with the motive means and valve member for translational movement of both of these components in unison.

The preferred positional means of the valve assembly includes one or more elongated guides with slider(s) connected with the valve member and operatively mounted on a corresponding guide for axial shifting therealong. Linkage means is operatively coupled with the slider for selective axial translational movement of the slider and hence the valve member in order to move the latter between the first and second translated positions thereof. The linkage means advantageously includes a manually operable handle connected therewith for allowing the desired translational movement of the valve member between the first and second positions thereof. The preferred linkage means has first and second pivotally interconnected linkage arms, with the handle means connected with one of the linkage arms.

As indicated, the valve assembly of the invention may be used in conjunction with a food pump broadly including means for creating a stream of material to be conveyed, with the valve assembly coupled with the stream-creating means adjacent the outlet end thereof. Although not limited in this respect, it is particularly preferred that the valve assembly of the invention be used with dual piston-type pumping apparatus.

BRIEF DESCRIPTION OF THE DRAWINGS

FIG. 1 is a front elevational view of a vacuumizer/twin piston food pump having the valve assembly of the invention mounted adjacent the output end thereof;

FIG. 2 is a fragmentary side view partially in section and illustrating the outlet valve end of the food pump depicted in FIG. 1 with the valve assembly in its operative position;

FIG. 5 is a vertical sectional view similar to that of FIG. 3, but depicting the valve member in its lowered, clean-out or inspection position;

FIG. 6 is a fragmentary plan view with parts broken away and partially in section and illustrating the internal construction of the valve assembly; and FIG. 7 is a sectional view with parts broken away and depicting the rotor actuator housing forming a part of the valve assembly.

DETAILED DESCRIPTION OF THE PREFERRED EMBODIMENTS

Figure 3:
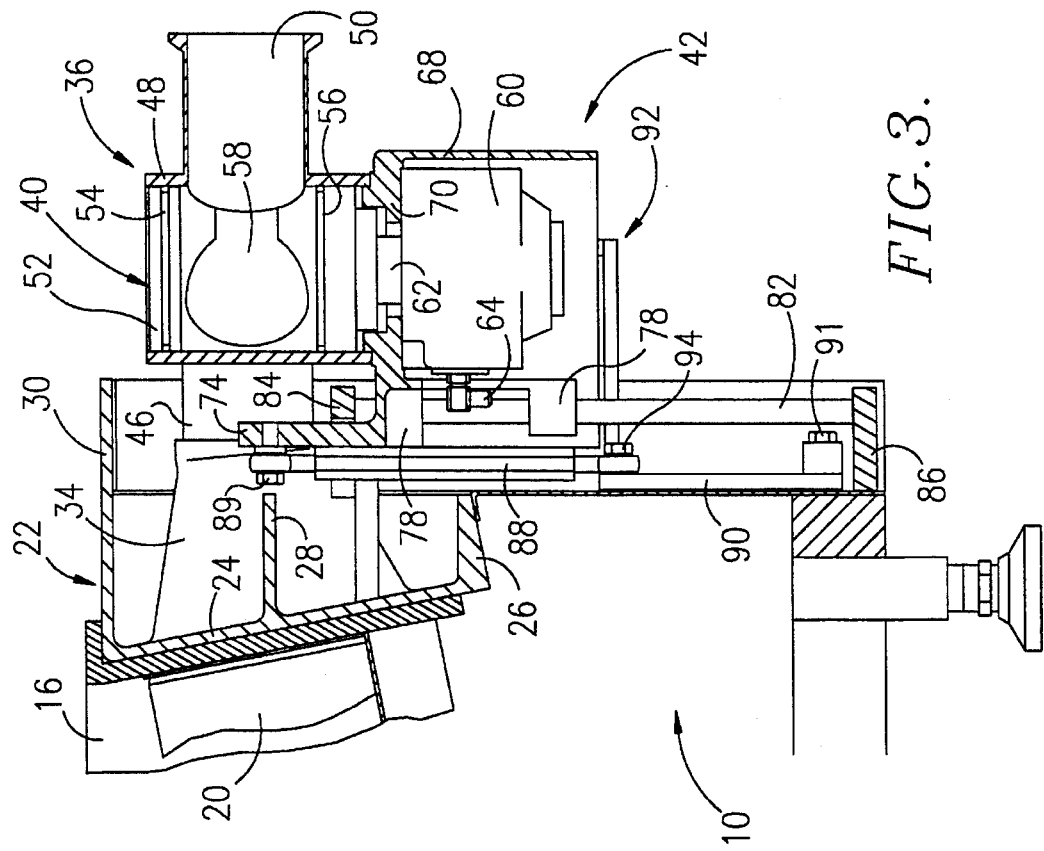
FIG. 3 is a vertical sectional view similar to that of FIG. 2 and illustrating the internal components of the outlet end of the food pump and the valve assembly.

Turning now to the drawings, and particularly FIG. 1, a twin piston food pump 10 is illustrated. The pump 10 includes an uppermost vacuumizer housing 12 as well as a lower funnel-shaped transfer section 14, the latter communicating vacuumizer housing 12 with a piston chamber 16. The chamber 16 houses a pair of reciprocable piston and sleeve assemblies 18, 20 and has, at the outlet end thereof, an end housing 22. The latter has an inclined, apertured wall 24, as well as forwardly extending reinforcing webs 26, 28 and 30 and a pair of generally conical housings 32, 34. As those skilled in the art will appreciate, operation of the piston and sleeve assemblies 18, 20 serves to create individual charges of the material being pumped which are delivered through the housings 32, 34.

The valve assembly 36 of the invention is mounted to pump 10 adjacent the forward end thereof and is designed to receive the individual charges of material and to direct these charges through and out of a single outlet. Broadly, the assembly 36 includes a stationary valve body 38, a rotor assembly 40, and structure 42 for selectively altering the position of rotor assembly 40.

In more detail, the valve body 38 is a stationary, metallic member which is generally Y-shaped in plan configuration as best illustrated in FIG. 6. The valve body 38 includes a pair of tubular inlet arms 44, 46 which are respectively coupled with the outlets of the corresponding housings 32, 34. The body 38 also includes a central, open ended, tubular rotor housing 48 which is essentially circular in cross-section. Finally, the body 38 has a single, forwardly extending, tubular outlet 50. As will be appreciated, the inlet arms 44, 46, and outlet 50, each communicate with the interior of rotor housing 48.

Rotor assembly 40 includes an uppermost, pivotal valve rotor 52 presenting upper and lower O-ring grooves 54, 56 as well as a laterally extending central recess 58 and a flow indicator 59 on the upper surface thereof (see FIG. 7). The rotor 52 is sized to fit within rotor housing 48, with O-rings (not shown) within grooves 54, 56 serving to create the necessary sealing relationship. The rotor 52 is pivotal within housing 48 for respectively communicating inlet 44 and outlet 50, and alternately inlet 46 with outlet 50. To this end, a conventional hydraulic actuator 60 is operatively coupled to the lower end of rotor 52 via drive shaft 62. The rotor is equipped with a pair of L-shaped hydraulic fluid elbow ports 64, 66 for the attachment of appropriate hydraulic lines (not shown) to the actuator; these lines are in turn coupled with the hydraulic system of pump 10 for timed operation of valve assembly 36 in proper relationship with the overall pump 10. As will be readily apparent, appropriate delivery of hydraulic fluid to one or the other of the elbows 64, 66 serves to pivot rotor 52 in a clockwise or counterclockwise direction in order to move the rotor 52 between the described flow positions.

Figure 4:
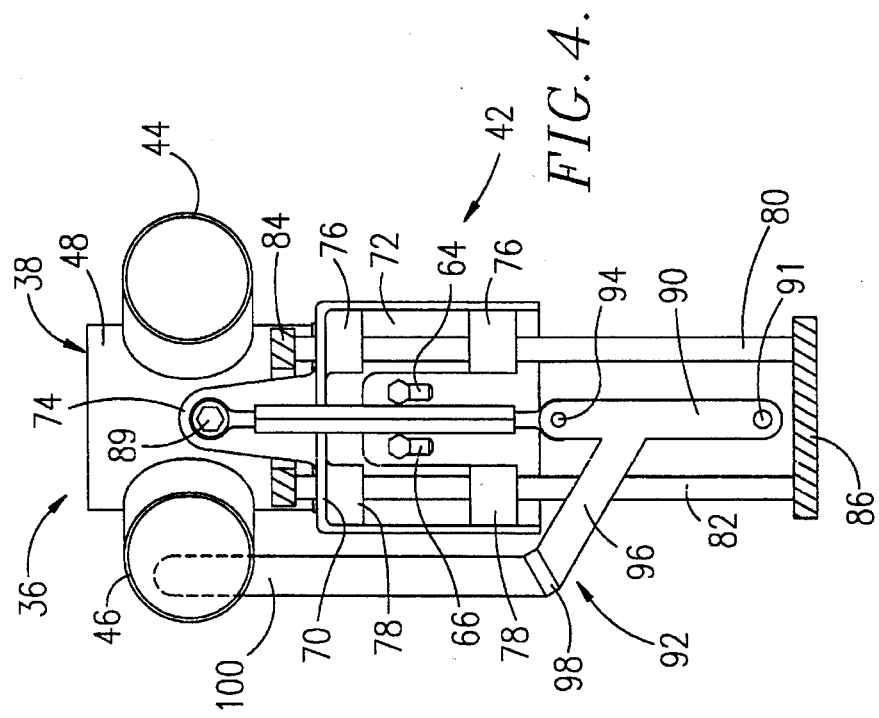
FIG. 4 is a rear sectional view illustrating the inlet side of the valve assembly of the invention, as well as the positional means associated therewith.

The structure 42 serves to permit selective translational movement of rotor 52 from a first position within housing 48 to a lowered, clean-out position wherein the rotor 52 is completely clear of the housing 48. Referring to FIGS. 4 and 5, it will be observed that the structure 42 includes an actuator housing 68 disposed about hydraulic actuator 60 and having an apertured top wall 70 to accommodate passage of drive shaft 62. The housing 68 has an open bottom and a relieved rear wall 72 permitting access to the fluid port 64, 66. Additionally, and as best seen in FIG. 4, the housing 68 includes a rearward, upstanding bracket 74 and two vertically spaced apart pairs of apertured slider blocks 76, 78 which are secured to rear wall 72 as shown.

The position-altering structure 42 further includes a pair of upright, stationary guides 80, 82 which are rigidly secured to corresponding upper and lower supports 84, 86 affixed to the machine frame; as best seen in FIG. 4, the guides 80, 82 are laterally spaced apart and are slidably received by the slider block pairs 76, 78.

The housing 68 and thereby actuator 60 and rotor 52 are shiftable along the length of the spaced guides 80, 82 through the medium of a pair of pivotally interconnected links 88, 90 and handle 92. The uppermost link 88 is pivotally coupled via pin 89 to bracket 74 as shown, whereas the lower end of shorter, bottom link 90 is likewise pivoted via pin 91 to the abutting frame of pump 10. The intermediate ends of the links 88, 90 are also pivotally interconnected by means of pin 94. Handle 92 includes a segment 96 integral with lower link 90, as well as a forwardly extending leg 98 and a normally upright handle 100.

In the normal use of valve assembly 36, rotor 52 is in its uppermost position fully within housing 48. In this position, the rotor 52 is selectively pivoted through the medium of actuator 60 in order to respectively communicate the inlets 44, 46 with outlet 50. This operation is in itself entirely conventional, and need not be explained in detail. When it becomes necessary or desirable to clean the assembly 36, flow of hydraulic fluid to actuator 60 is terminated, and pump 10 is otherwise shut down. At this point, the handle 100 is manually grasped and rotated in a clockwise direction as best seen in FIG. 1 until the handle assumes the position shown in phantom in that Figure. Such rotation of the handle serves to lower the actuator 60 and rotor 52 to the positions illustrated in FIG. 5, i.e., with the rotor 52 completely outside of housing 48. In this orientation, it is a simple matter to clean and/or inspect the rotor 52, as well as the inside of stationary valve body 38. Once these necessary tasks have been completed, the above operation is reversed by rotating handle 100 counterclockwise in order to shift the rotor 52 is shifted back upwardly into the confines of housing 48. Preferably, the handle 100 in its uppermost position is in an "over-center" orientation in order to preclude inadvertent translational movement of the valve rotor 52 during normal operation thereof. Of course, other means of securing the valve member in its uppermost position could also be employed. In any case, when the rotor 52 is back in its upper position within housing 48, the valve assembly 36 is again ready for operational use.

We claim:

1. A rapid clean-out valve assembly, comprising:

a valve body having a material inlet and a material outlet;

a valve unit including a valve member located within said valve body and motive means operatively coupled with said valve member for selectively moving said valve member within said valve body for communicating said inlet and said outlet; and valve unit moving means including selectively actuatable positional means operatively coupled with said valve unit for translational movement of said valve unit between a non-actuation position wherein said valve member is within said valve body in order to permit said selective moving of the valve member therein, and a cleaning position wherein the valve member is at least partially moved out of said valve body in order to gain access to clean the valve body interior and valve member, said valve unit moving means further including structure supporting said valve unit for said translational movement thereof.

2. The valve assembly of claim 1, said valve member being a rotor which is selectively rotatable within said valve body.

3. The valve assembly of claim 1, said positional means comprising:

an elongated guide;

a slider connected with said valve member and operatively mounted on said guide for axial shifting therealong;

linkage means operatively coupled with said slider for selective axial movement thereof along the length of said guide in order to move said valve member between said non-actuation and cleaning positions thereof.

4. The valve assembly of claim 3, including handle means connected with said linkage means for manual movement of said valve member between said non-actuation and cleaning positions thereof.

5. The valve assembly of claim 4, said linkage means including first and second pivotally interconnected linkage arms, said handle means being connected with one of said arms.

6. A pump, comprising:

means for creating a stream of material to be conveyed;

a valve assembly operatively coupled with said stream-creating means and including a valve body having a material inlet oriented for receiving said material stream and a material outlet for delivery of the material stream from the pump, and a valve unit including a valve member located within said valve body and motive means operatively coupled with said valve member for selectively moving said valve member within said valve body for communicating said inlet and said outlet; and valve unit moving means including selectively actuatable positional means operatively coupled with said valve unit for translational movement of said valve unit between a non-actuation position wherein said valve member is within said valve body in order to permit said selective moving of the valve member therein, and a cleaning position wherein the valve member is at least partially moved out of said valve body in order to gain access to clean the valve body interior and valve member, said valve unit moving meads further including structure supporting said valve unit for said translational movement thereof.

7. The pump of claim 6, said stream-creating means comprising a pumping assembly including at least one reciprocable piston.

8. The valve assembly of claim 6, said valve member being a rotor which is selectively rotatable within said valve body.

9. The valve assembly of claim 6, said positional means comprising:

an elongated guide;

a slider connected with said valve member and operatively mounted on said guide for axial shifting therealong;

linkage means operatively coupled with said slider for selective axial movement thereof along the length of said guide in order to move said valve member between said non-actuation and cleaning positions thereof.

10. The valve assembly of claim 9, including handle means connected with said linkage means for manual movement of said valve member between said non-actuation and cleaning positions thereof.

11. The valve assembly of claim 10, said linkage means including first and second pivotally interconnected linkage arms, said handle means being connected with one of said arms.

* * * * *